(12) United States Patent
Pullam et al.

(10) Patent No.: US 6,396,971 B1
(45) Date of Patent: May 28, 2002

(54) OPTICAL DIGITAL WAVEFORM GENERATOR

(75) Inventors: Martin L. Pullam, Littleton; Ronald E. Rope, Denver, both of CO (US)

(73) Assignee: T Squared G, INC, Denver, CO (US)

( * ) Notice: Subject to any disclaimer, the term of this patent is extended or adjusted under 35 U.S.C. 154(b) by 0 days.

(21) Appl. No.: 09/538,097

(22) Filed: Mar. 29, 2000

Related U.S. Application Data

(60) Provisional application No. 60/126,658, filed on Mar. 29, 1999.

(51) Int. Cl.[7] .................................................. G02B 6/42
(52) U.S. Cl. .............................. 385/16; 385/15; 385/17; 385/20; 385/24; 385/31; 385/1
(58) Field of Search ............................... 385/15, 16, 17, 385/20, 24, 27, 31, 123, 1; 359/115, 117, 127, 128, 138, 139, 184, 185, 186

(56) References Cited

U.S. PATENT DOCUMENTS

| | | | |
|---|---|---|---|
| 4,475,212 A | * 10/1984 | McLean et al. | 375/17 |
| 5,111,322 A | * 5/1992 | Bergano et al. | 359/122 |
| 5,121,240 A | * 6/1992 | Acampora | 359/138 |
| 5,307,428 A | * 4/1994 | Blow et al. | 385/11 |
| 5,428,697 A | * 6/1995 | Dolfi et al. | 385/24 |
| 5,434,937 A | * 7/1995 | Glance | 385/24 |
| 5,557,693 A | * 9/1996 | Stevens et al. | 385/24 |
| 5,768,242 A | 6/1998 | Juday | 369/103 |
| 5,815,482 A | 9/1998 | Rope et al. | 369/112 |
| 5,870,227 A | 2/1999 | Rope et al. | 359/618 |
| 5,953,138 A | * 9/1999 | Ellis | 359/123 |
| 6,012,855 A | * 1/2000 | Hahn | 385/89 |
| 6,125,217 A | * 9/2000 | Paniccia et al. | 385/14 |
| 6,185,025 B1 | * 2/2001 | Blown et al. | 359/188 |
| 6,289,142 B1 | * 9/2001 | Yamada | 385/1 |

* cited by examiner

*Primary Examiner*—Brian Healy
(74) *Attorney, Agent, or Firm*—Zoltick Technology Law Group, PLLC

(57) ABSTRACT

A method and a system for generating optical waveforms from electrical signals is disclosed. An input electrical signal is sampled to obtain a single channel data which is converted to multi-channel data. The multi-channel data is converted to multi-channel electrical pulses which are input along with a light source output into a switch array containing optical switches to obtain a multi-channel optical waveform made up of a plurality of optical waveforms. These waveforms are superpositioned to generate a stacked optical pulse. Alternatively, the multi-channel data may be converted to a multi-channel optical pulses. The stacked optical pulse may be used to write data to a storage medium.

22 Claims, 16 Drawing Sheets

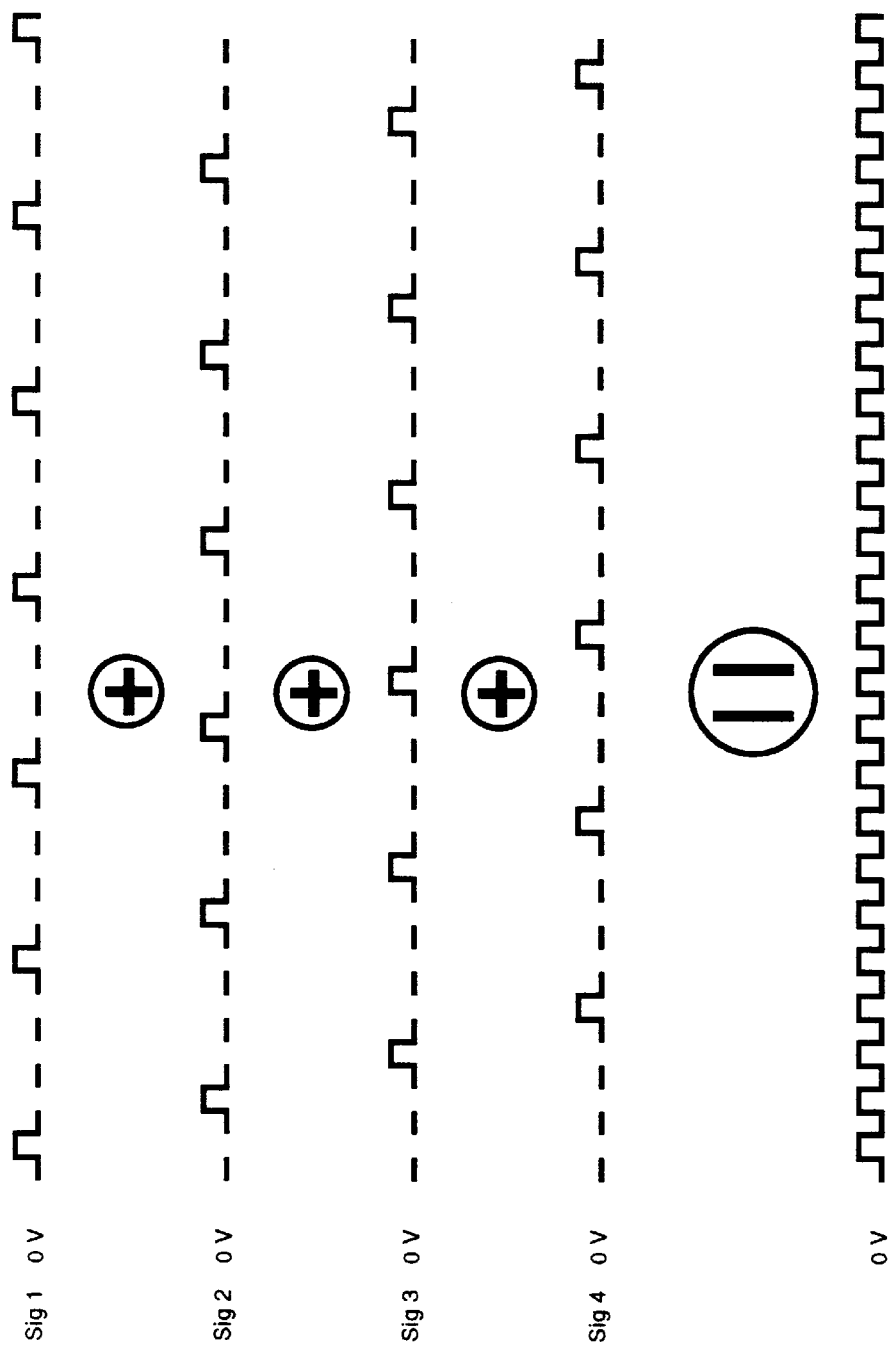

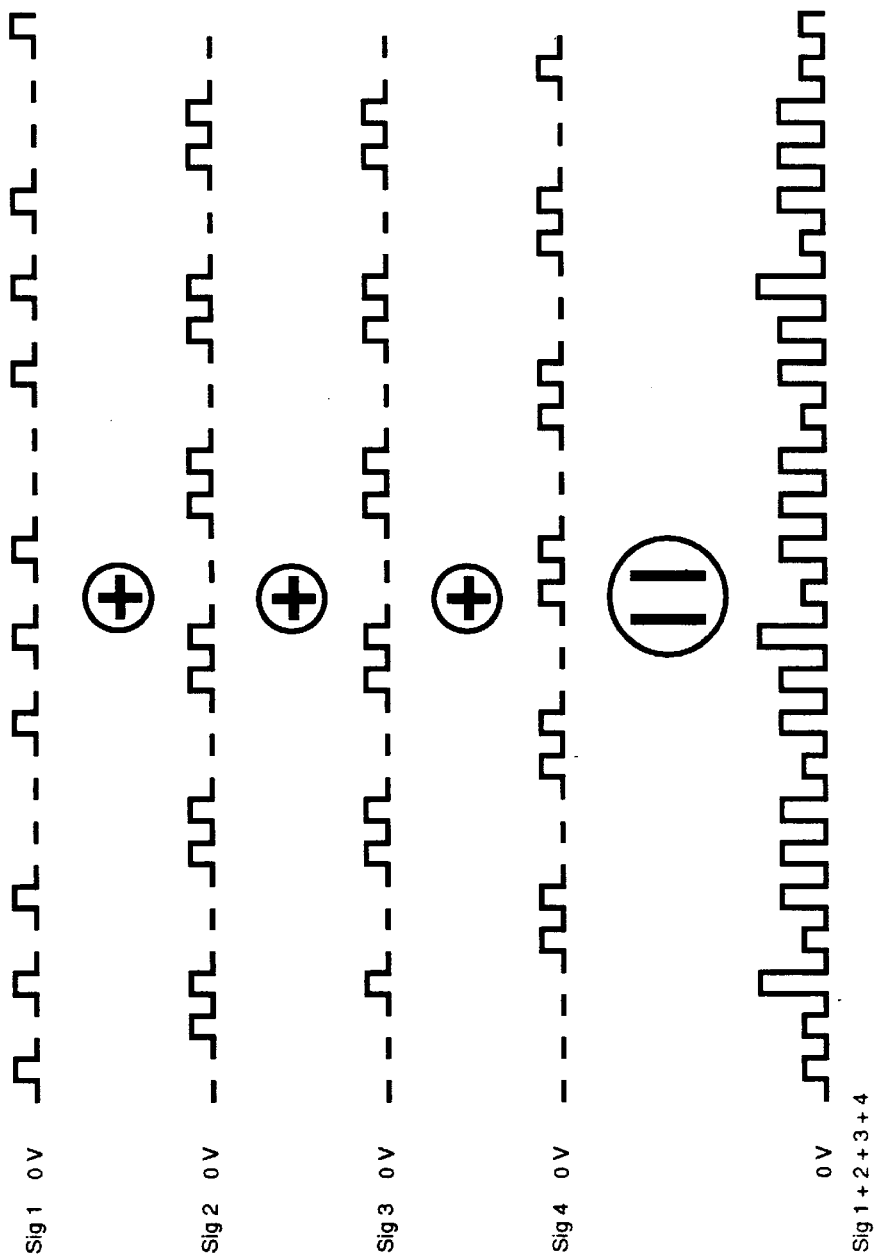

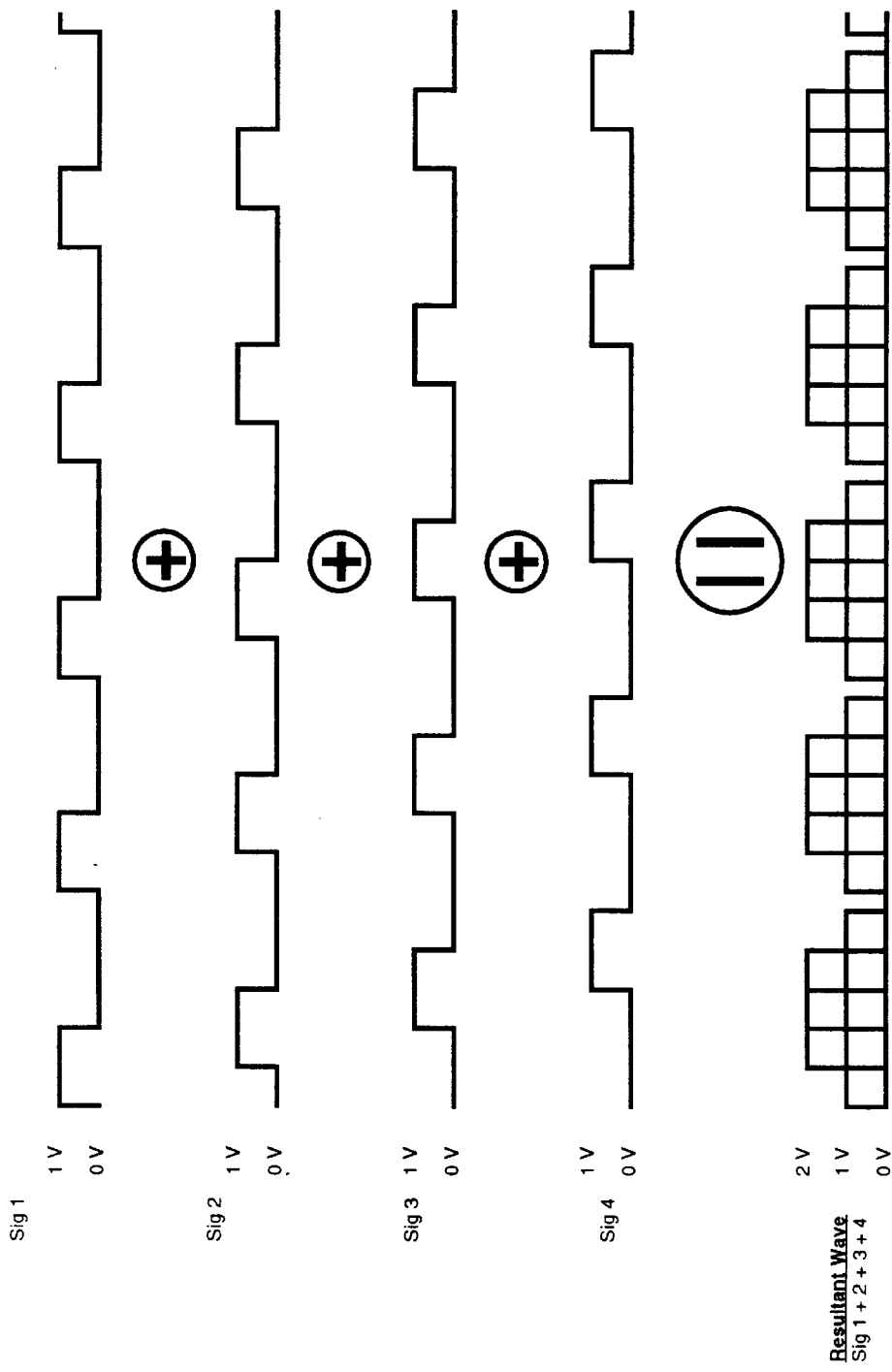

Media reaction to a max power pulse

Laser Light Pulse
(Write or Read)

Typical Pulse Form Parameters

Ideal Pulse Form

Realistic Pulse Form

Actual Pulse Form

Time ⟶

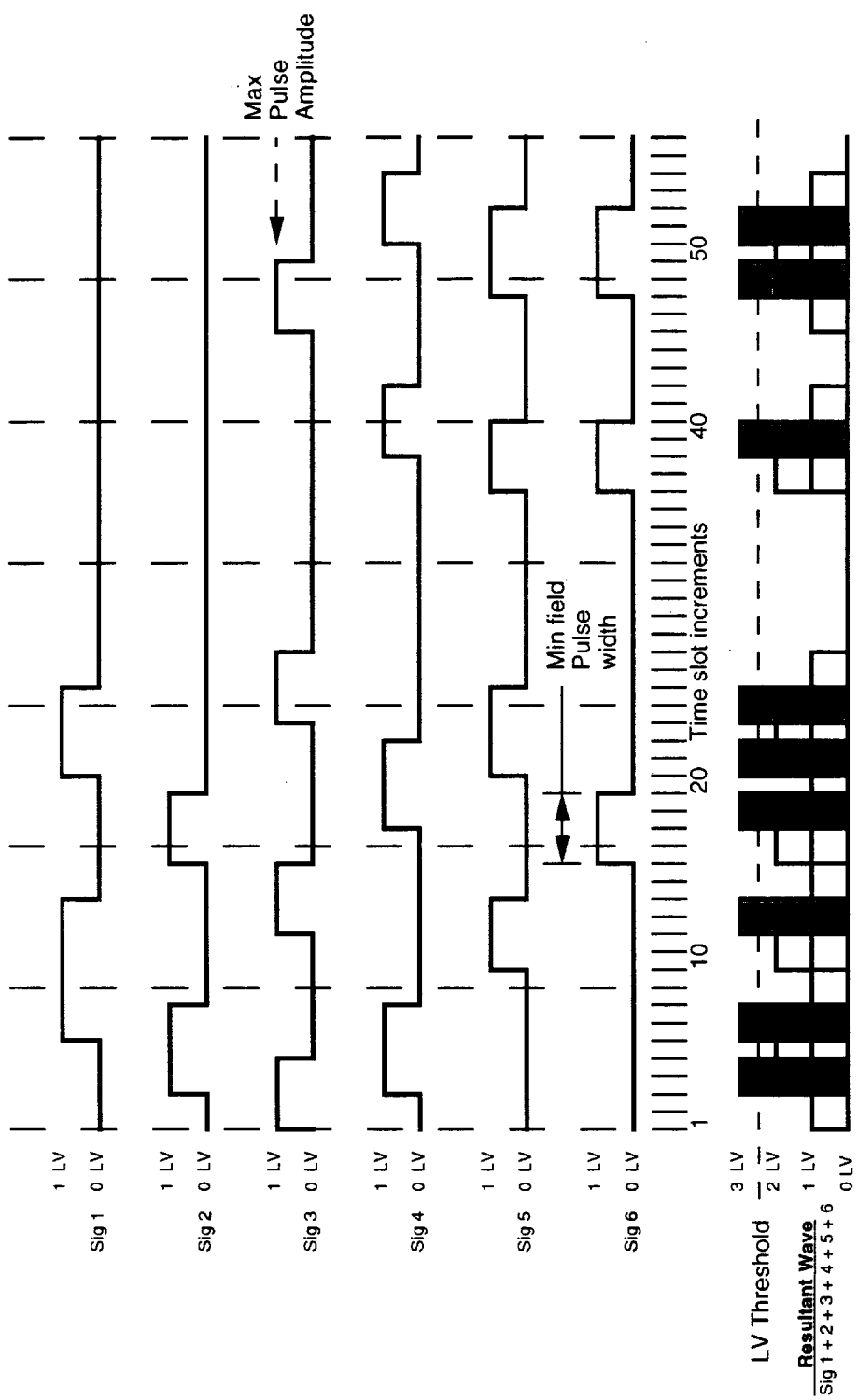

Pulse Period

Electrical Inputted Digital Waveform

Digital Input Converter - Sampling pattern

Digital Input Converter - Binary sampling result 0 0 0 0 1 1 1 1 0 0 0 0 0 0 0 0 0 1 1 1 1 0 0 0 1 1 1 1 0 0 0 0 0 0 0 0 0 1 1 1 1 0

| | 0 | 0 | 0 | 1 | 1 | 1 | 1 | 0 | 0 | 0 | 1 | 1 | 1 | 1 | 1 | 0 | 0 | 0 | 1 | SChan In |
|---|---|---|---|---|---|---|---|---|---|---|---|---|---|---|---|---|---|---|---|---|
| | 0 | 0 | 0 | 0 | 0 | 0 | 0 | 0 | 0 | 0 | 0 | X | X | X | X | X | X | X | X | MChan 6 |
| | X | X | X | X | X | X | X | X | 0 | 0 | 0 | 0 | 0 | 0 | 0 | 0 | 0 | 0 | 0 | MChan 5 |
| | 0 | 0 | 0 | X | X | X | X | X | X | X | X | X | X | X | X | 0 | 0 | 0 | 0 | MChan 4 |
| | 0 | 0 | 0 | 0 | 0 | 0 | 0 | 0 | 0 | 0 | X | X | X | X | X | X | X | X | X | MChan 3 |
| | X | X | X | X | X | X | X | X | 0 | 0 | 0 | 0 | 0 | 0 | 0 | 0 | 0 | 0 | X | MChan 2 |
| | 0 | 0 | 0 | X | X | X | X | X | X | X | X | X | X | X | X | X | X | X | X | MChan 1 |
| Total "X"s | 2 | 2 | 2 | 4 | 4 | 4 | 4 | 4 | 3 | 2 | 2 | 4 | 4 | 4 | 4 | 4 | 3 | 3 | 3 | 4 |

Channel Conversion Matrix

One to One pattern

One to One half pattern

One to two pattern

Example Legend:
Input pulse period is 6 slots; 4 positive and 2 guardban
MZ gate period is 6 slots minimum hold and 3 recovery
Media switch level magnitude is 4 (Phase Change Threshold)
There are 5 MZ channels Period Halving Example for Electro to Optical Converter

OPTICAL DIGITAL WAVEFORM GENERATOR

RELATED APPLICATIONS

This application claims the benefit of U.S. Provisional Application No. 60/126,658, filed on Mar. 29,1999, pending.

BACKGROUND

The present invention is directed to generation of an optical waveform and more specifically to a method and a system for generating optical waveforms from electrical signals.

Within modem switching and storage systems, digitizing and the manipulation of data is performed almost exclusively in the electrical mode as opposed to the optical mode. The primary reason is that the electrical mode offers a plethora of switching components and techniques developed over almost a century of use. While optics have been used, they have predominantly been deployed in an analog mode. Digital optics were pioneered by the telecommunications industry and also used somewhat in the data storage industry. However, digital optics have not, until recently, been viewed by the universal signaling and control industry as a practical (i.e. economical) solution.

With the advent of high speed data transmission requirements in such areas as networks, buses, and the internet, digitally pulsed optical signal techniques, switchers and media have experienced an increasingly strong demand.

A key component in satisfying this surging demand is the provision of a signal modulated light source to generate the encoded signal pattern. One of the more prominent devices being utilized for this function is the LED (Light Emitting Diode). An LED is a solid state device, which emits photons of light, based on the direct electronic switching of its input junction. The light pulses generated are relatively fast (i. e. solid state rates). The disadvantage of LEDs, however, is that the light power outputted from the device is relatively low. The LED is typically rated in millivolts.

An alternative device to the LED is an optical switch, such as a Mach-Zehnder, for example. This device is controlled by an electrical input, which gates a separately provided light input (as opposed to generating light from within the device) through the device to its output when the device is "on." No light is outputted when the device is "off". A third alternative, is a Lucent device titled "Seeds" (Self Electro-Optic Effect Device). This device attenuates (at a specific frequency range) or passes a light input through the device to the output. It is also controlled by an electronic signal input. All of these aforementioned devices have relatively low light power outputs. There are other optical digital pulse producing devices, such as a "Chirped-Pulsed Laser", which are in experimental stages and commercially available.

Inert gas lasers (i. e. neon, argon), have also been utilized as a source of optical digital pulse patterns. Their applications tend to demand high lumen power and permit the output waveform to have extended pulse widths. These waveforms are typically generated by modulating the gas laser's output. The modulation techniques have included mechanical shutters in the early applications and optical attenuators more recently, both of which allow or deny the passage of the output light beam. These techniques produce significantly higher power photonic digital outputs but at a much slower digital rate than the solid state or electroa-optic techniques mentioned above. Another category of high powered laser, is the "Ultra-fast Laser" which can deliver extremely high powered beams concentrated within a tight pulse. This category will not be addressed herein; however, as the delivery systems are extremely expensive (in excess of a million dollars) and the pulse repeatability patterns are not conducive to the needs addressed by the present invention.

These two extremes, high power or low power, have been successfully utilized in various industries demanding their unique but opposing characteristics. At present, there is no middle ground device which would offer significant photonic output power at high speeds (i. e. narrow pulse widths), and at a competitive "commercial electronics unit" cost.

SUMMARY

It is therefore, an object of the present invention, to overcome the shortcomings highlighted above by providing a method and a system for converting electrical signals to multi-channel optical digital waveform, the individual waves being superpositioned to form a stacked optical pulse.

According to an exemplary embodiment of the present invention, a method for converting an electrical signal to an optical pulse is disclosed, the method comprising the steps of: receiving said electrical signal; sampling said received signal to obtain a single channel data; converting said single channel data to multi-channel data; converting said multi-channel data to a plurality of electrical pulses wherein said first plurality corresponds in number to a number of channels in the multi-channel data; inputting said first plurality of electrical pulses and a light source output into a switch array comprising a plurality of optical switches to obtain a multi-channel optical waveform comprising a plurality of optical waveforms; and superpositioning (or, superimposing) each of the third plurality of optical waveforms to generate a stacked optical pulse.

According to another exemplary embodiment of the present invention, a system for onverting an electrical signal to an optical waveform is disclosed, the system comprising: a digital converter means for receiving and sampling said electrical signal to obtain a single channel binary data; a channel conversion means for converting said single channel data to multi-channel data; a digital pulse generation means for converting said multi-channel data to a plurality of electrical pulses; a switch means, comprising a plurality of optical switches, for receiving said plurality of electrical pulses and a light source output, with each of said electrical pulses corresponding to at least one of the optical switches, and for outputting a multi-channel optical waveform comprising a plurality of optical waveforms; and a stacking means for superpositioning the plurality of optical waveforms from the multi-channel optical waveform.

According to yet another exemplary embodiment of the present invention, a method of using optical pulses to write data generated from an electrical signal is disclosed, the method comprising the steps of: receiving an electrical signal; sampling said received signal to obtain a single channel binary data; converting said single channel data to multi-channel binary data; converting said multi-channel data to a plurality of electrical pulses; inputting said plurality of electrical pulses and a light source output into a switch array comprising a plurality of optical switches, with each of said electrical pulses corresponding to at least one of the plurality of optical switches, to obtain a multi-channel optical pulse waveform comprising a plurality of optical waveforms; stacking the optical waveform by superpositioning an amplitude of each of the plurality of optical waveforms to form a stacked optical pulse; deriving data from said stacked optical waveform; and writing said derived data onto a storage medium on a non real-time basis.

According to a further exemplary embodiment of the present invention, a method for converting an electrical signal to an optical pulse is disclosed, the method comprising the steps of: receiving said electrical signal; sampling said received signal to obtain a single channel data; converting said single channel data to multi-channel data; converting said multi-channel data to a plurality of optical pulses; inputting said plurality of optical pulses and a light source output into a switch array comprising a plurality of optical switches, with each of said plurality of optical pulses corresponding to at least one of the optical switches, to obtain a multi-channel optical waveform comprising a plurality of optical waveforms; and superpositioning each of the plurality of optical waveforms to generate a stacked optical pulse.

BRIEF DESCRIPTION OF THE DRAWINGS

The above objects and features of the present invention will be more apparent from the following description of the preferred embodiments with reference to the accompanying drawings, wherein:

FIG. 1 illustrates superposition of waveforms which are single level interspersed waves;

FIG. 2 illustrates superposition of waveforms which are interspersed but also interact with each other;

FIG. 3 illustrates superposition for the addition of fractions of pulses within waveforms;

FIG. 6 illustrates the generation of a digital optical waveform from multiple digital optical waveforms;

DETAILED DESCRIPTION

Figure 4A:
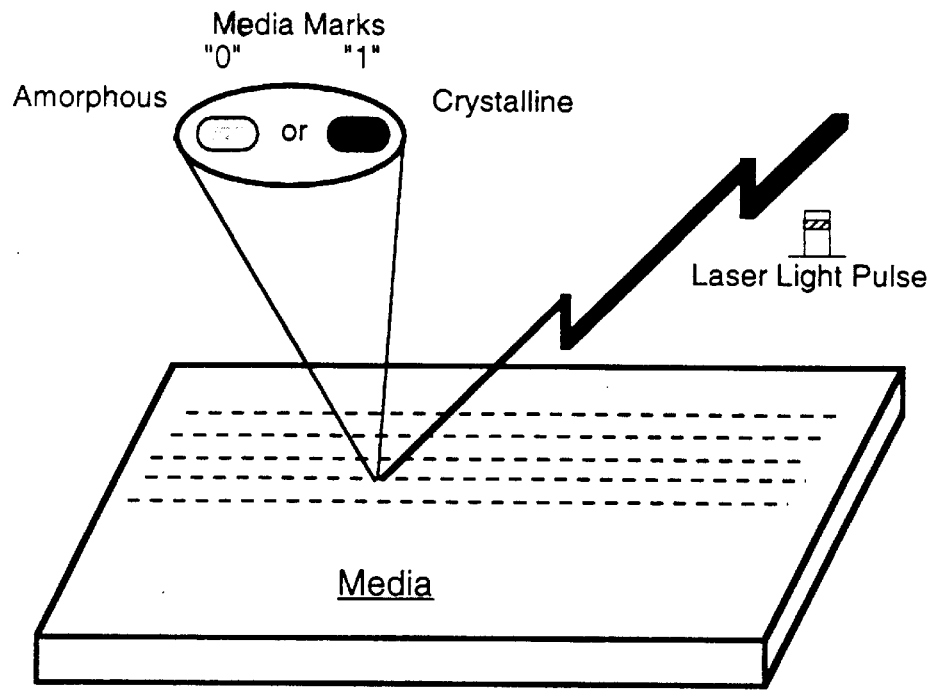
FIG. 4 illustrates the characteristics of an optical pulse which affect the switching of an optical phase change media.

In the following description, for purposes of explanation and not limitation, specific details are set forth, such as particular methods, techniques, block diagrams, etc. in order to provide a thorough understanding of the present invention. However, it will be apparent to one skilled in the art that the present invention may be practiced in other embodiments that depart from these specific details. In other instances, detailed descriptions of well-knows methods, techniques and diagrams are omitted so as not to obscure the description of the present invention.

This invention was necessitated by a need to generate digitally encoded optical pulses conforming to digital data inputted in an electrical mode. Exemplary embodiments are directed to writing data inputted via electrical digital pulses to a storage media using optical digital pulses. Owing to the nature of the media to be used, these optical pulses require a relatively high power content to affect writing. In addition, the duration of the optical pulses should be as short or shorter than the duration of the electrical input signal in order to minimize the time in which data is written.

The stored data will eventually be recovered (i. e. read) by continuous (non-modulated) light beams of significantly lesser power as compared to the write pulse, which would be scanned across the media surface. The read scan will generate a reflection from the media surface having optical variations caused by surface anomalies from previously 'written data. These optical variations will be converted into electrical digitally encoded pulses via an optical detector.

The encoded light pulses for writing data (i.e. an optical waveform) must be transmitted between two points after the signal pattern is formed. The optical waveform does have several parameters which must be satisfied prior to the transmission, as the waveform may not be altered along its path.

The first parameter is that the optical waveform conform to the same time period as the input electrical signal. It should be noted that the signature of the optical waveform will not necessarily conform exactly to the signature of input electrical form signature as certain storage technologies demand that the media be written in a special format code. The formatting code takes advantage of all transitions in the waveform (leading and trailing)in addition to condensed coding of repetitive pulse patterns (i. e. a series of all ones, a series of all zeros, or a repeating sequential pattern of ones and zeros). This concept, illustrated in FIGS. 7a and 10 and explained later, depicts an example of the translation from received electrical digital code to an equivalent optical code to be written to media.

The second parameter is that each pulse within the optical waveform, at its inception point, contain sufficient power so that the pulse delivered to the media contains enough power to switch the media state if required by that code instance (i. e. write a transition to the media). The individual pulse power may be construed as the area under the curve defining the pulse (i. e. the amplitude times the width). It should also be pointed out that the optical waveform may ride atop a constant or analogue carrier. The optical waveform and the carrier could combine to form the sum power requirement for a written media transition. The interaction of these possibilities and parameters will become clearer with the insight gained from the following text.

Bearing the aforementioned in mind, the specific embodiment described below provides a method of transducing electrical to optical signals at adjustable power and timing level's, The specific embodiment will describe an application wherein this transformation is utilized for writing data to an optical media; however, the technique is not limited to that singular application. Another application may be free space transmission of optical semaphore codes. Additionally, coupled with the scanning techniques described in U.S. Pat. No. 5,815,482 and application Ser. No. 08/816,688, the invention could also be utilized to both display a pixel developed light image on a target surface. The image would be formed by sending the entire image at one time via multiple light beams rather than the current conventional method of scanning across a photonic surface with a singular electron beam.

The present invention utilizes the Electronics/Magnetics law of Superposition and the Optics law of Interference and Diffraction. These laws generally teach the common principle of the ability of waveforms/signals to positively combine (or to negatively cancel) to form a third waveform/signal. The eventual combined impact, either positive or negative, is contingent upon the phase and frequency relationship of the individual waves.

For simplicity of explanation, we shall examine several illustrations of the combinational effects of generic digital waveforms where it will be assumed, in an ideal environemnt, that the waveforms are all of the same frequency and either in phase or 180 degrees out of phase (i. e. perfect addition or cancellation).

FIG. 1 illustrates the simplest example of this theorem wherein Sig (i. e. waveforms) 1, 2, 3, & 4 combine into the waveform in the lower portion of the Figure in an interspersed manner. It should be noted that the content of individual signals do not combine with the content of other signals in this example but simply assume an open time slot (i. e. signal+zero equal signal). A circuit or for performing this combination is not discussed as these techniques are widely known and practiced by those skilled in the art.

FIG. 2 illustrates a variation of the concept of superposition. Both the interspersion of signals and the addition of signals in common time slots, which form a new waveform is illustrated. It should be noted here that all of the pulses are still separated by a guard-band/guard-space having a zero value.

FIG. 3 ilustrates another variation of the additive concept while introducing the idea of time shifting the individual signal (Sig 1, or Sig 2, or Sig 3, or Sig 4) pulse pattern to construct a variety of resultant positive waveforms. The resultant waveform in FIG. 3 contains a repetitive series of pulse forms separated by a repetitive gap or time space (guard-band). The time space is generated by a lack of pulse patterns in any of the signals (1 to 4) at those particular points. Although not specifically illustrated, it is apparent that the signal pulse patterns are staggered or placed on a grid, the coordinates of which are much smaller than the pulse shapes themselves. This grid, although not necessary to the superposition laws, is the basis for establishing a timed pulse placement coordinate system that is essential for coding of the signal according to exemplary embodiments of the present invention. The grid is set at the incremental value of a clock pulse. The significance of this concept will become apparent with further description of the present invention.

Depending on the number of individual signals, the shift of their pulse pattern, and the duration of their individual pulse patterns, almost any customized positive waveform can be configured. Although not shown herein for reasons that become apparent later, Signals 1 through 4 could have been negative patterns (i. e. −1 V pulses) which would subtract value from other signals to form the resultant waveform.

Pulse and/or waveform generation and shaping in the electrical mode is well known and practiced for a variety of specific circuit needs. As previously noted, not so widespread however, is the need to generate an optical pulse from an electrical pulse pattern, and more specifically, to generate that optical pulse at a predetermined lumen power level and period.

In the preferred embodiment of this invention, a light pulse is directed to a specific target area on a media surface and held there for a specific period of time before it is shut off or moved. The "on" time being the pulse width. If the pulse is of sufficient power level (and maintained for a sufficient duration), the localized and targeted media area will change state from an amorphous to a crystalline structure or vice versa (a mark is written), for a "Phase Change" type media (refer to FIG. 4A).

Figure 4B:
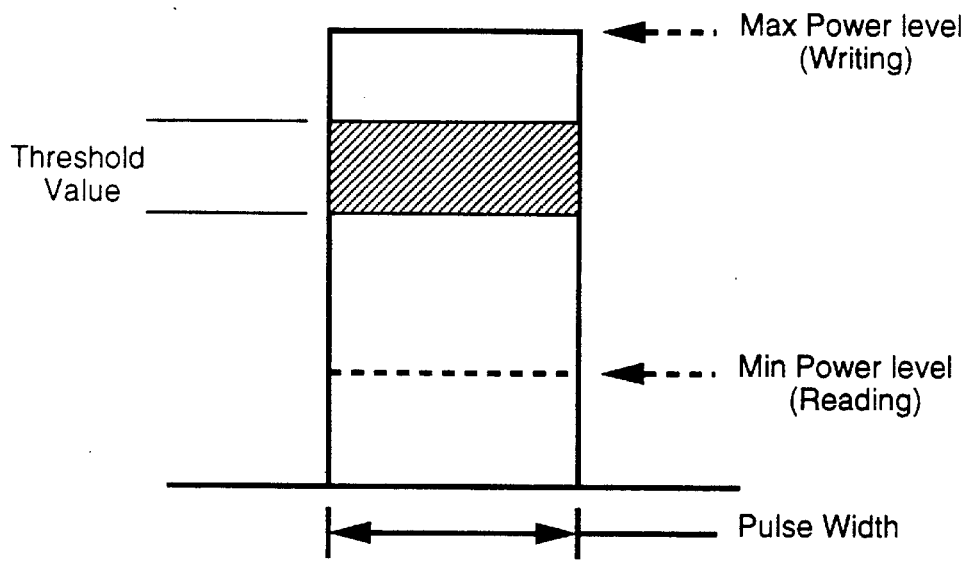

The definition of sufficient power varies dependant upon material, the ambient temperature, and the media area spot size (domain). To assure the change-of-state, a minimum threshold light amplitude level is indirectly defined by the media material for a unit area along with an adequate time for which the pulse must dwell on the media to transfer power (energy). As the conditions vary across the surface of the media, a min/max range, or threshold band (FIG. 4B)is determined to assure that the pulse power level is above this threshold band for the necessary duration so as to ensure that the media area does switch state. As a normal course of events the light amplitude is provided well above that value. As previously noted, energy can be measured as the area under the pulse. If the pulse is narrow it must of necessity be higher, or contrarily, if the pulse is shorter it must be proportionately wider so that the area remains the same. The threshold band must of course be proportionately adjusted for these height or width changes.

Although not pertinent to this specific application of the invention, it should be noted that these power considerations or requirements do not apply to the "Reading" of a media code or to the light wave which affects that reading. The "reading" optical pulse need only be of sufficient power (FIG. 4B) to adequately carry the reflection to a digital detector which converts (transduces) the optical reflection into an electrical digital waveform.

The Electro-Optic switching devices discussed previously have several other common parameters which were not stressed. The first is that light, unlike electricity, cannot have a negative value. Consequently, when light is switched, it is either on or off, positive or zero. Superposition summations can only then rely on these states to form the eventual resultant "positive" optical waveform.

Figure 5A:
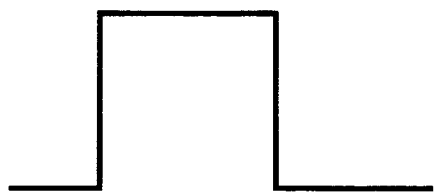
FIGS. 5A–5C illustrate the practical and useable characteristics of a typical actual pulse.
Figure 5B:
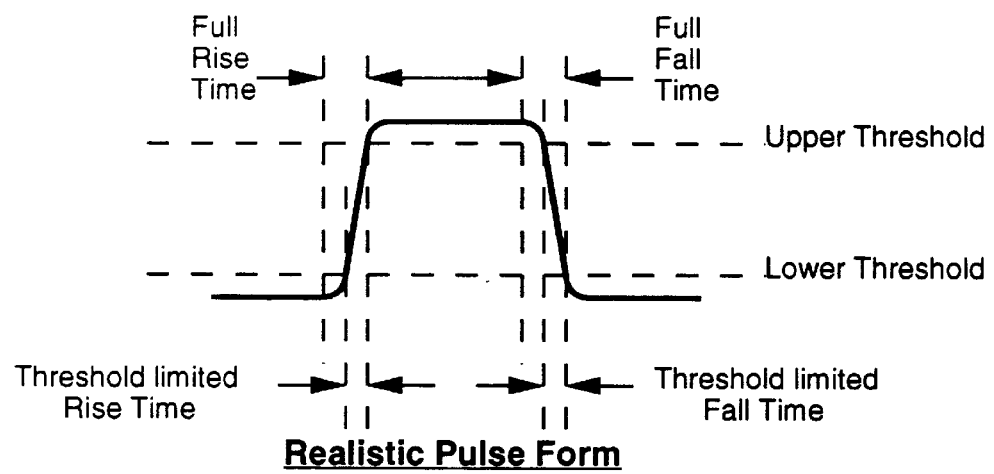

Secondly, although the electronic switches mentioned are indeed solid state devices, they are field effect dependant, or essentially capacitive with a finite (and fixed)rise/fall time. Rise time is defined generally as the time required to have a signal transition from its ground level to a cited amplitude. Fall time is the time required for that same waveform to transition from amplitude to ground. As a consequence, the devices cannot switch (i. e. change state) as quickly as an independent junction type device and of necessity must hold a state (on or off) for a longer period of time before switching back to the original state. FIG. 5A illustrates an ideal pulse form and FIG. 5B illustrates the distortion of the ideal pulse by rise and fall times.

Figure 5C:
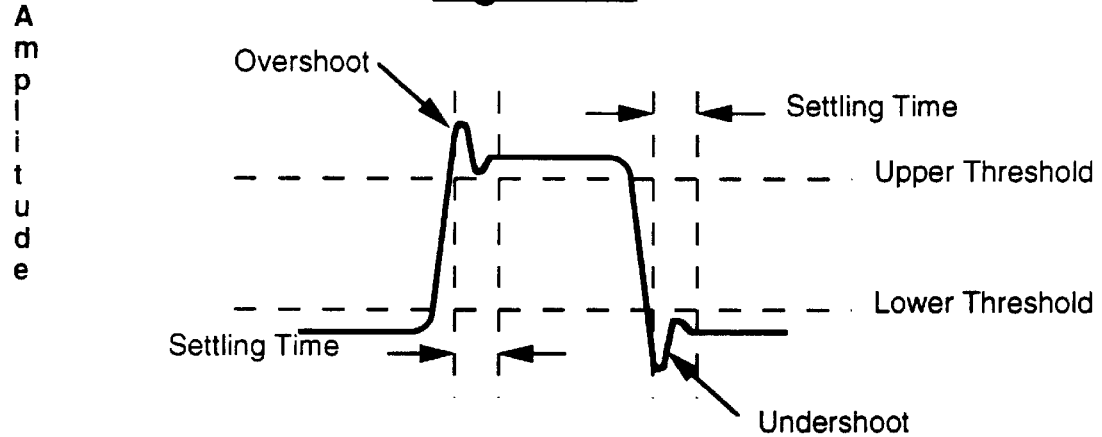

Another non-ideal electrical pulse characteristic is termed undershoot or overshoot. This distortion occurs as a consequence of inductance within the circuit and exhibits itself as an oscillation at the end of a change of state (i. e. amplitude)

of a pulse (FIG. 5C). The time for this oscillation to die away (i.e. damp out) is dependant on the amount of local circuit elemental values of resistance, capacitance and inductance.

In order to minimize the effects of these distortions, without modifying the circuit elements, designers have long practiced the technique of using the leading and trailing edges of pulses as the criteria for what actually triggers events, as opposed to utilizing the entire pulse waveform as the trigger for the action. In addition, designers have also segmented the "actual" pulse shapes by assigning amplitude levels with designated upper and lower threshold values. This is based on the fact that when the electrical level, either voltage or current, ascends to the upper threshold or decays to the lower threshold, the event is triggered regardless of the pulse's succeeding wave shape. Another option available for preventing overtly sustained rise times is to hold the device's physical field junction to a minimum (i.e. clamp the device) which literally restricts the output's amplitude to some predetermined minimal level.

As shoen in FIG. 5B, this assignment and use of thresholds eliminates the necessity of waiting for the pulse's electrical level to not only reach its full transition level but also the need for the signal to traverse the entire rise or fall time and have to compensate for over or under shoot. Even more significant to high speed switching designers, the assignment reduces the time required to trigger an event. Although each situation is unique, an examination of the pulse shape example in FIG. 5B from either upper or lower threshold suggests that the transition time is about half of the actual full transition time.

Because of the previously mentioned requirements of the normal light switches (high speed-low power and low speed-high power), coupled with non-ideal characteristics of pulse forms just described, the current modulating switches cannot be utilized in a high speed optical digital pulse generation environment. The reason for this limitation is that the switches would operate too slowly and thereby void the first system requirement of having the optical waveform (output) generated at the equivalent speed of the inputted electrical waveform. As the optical output of the faster switches are less power productive (to reduce rise times), the ability to construct a sufficiently powered wave (second system requirement) would likewise be jeopardized. The solution lies in a technique of the present invention which would generate a faster switch with amplitude adjustment.

Phase change optical media has a unique inherent characteristic for a material, in that it will change its molecular structure from crystalline to an amorphous state or vice versa with an application of a specific amount of heat to a domain. Furthermore, unless the applied heat (energy) is provided at the level demanded by the material, the molecular structure will not switch states. This is somewhat analogous to a magnetic hysteresis loop, in that once positioned in one of the two stable states, the material cannot transition to the alternate state without sufficient energy being applied. This material switch level characteristic will be used advantageously in developing a digital optical waveform.

As described previously, a Mach-Zehnder switch is available with characteristics of the speed of a solid state device but with a relatively low power output. As a solid state device, this switch offers the capability to have multiple individual switches combined within a silicon block and offered as a singular component. Based on the multiple device premise, a common light source such as a laser for example, can be fed to this component, which could have six light channels controlled by six individual electrical gates. Pulsing these gates with six independent electrical digital waveforms yields six independent digital light waveforms (which would mimic their respective gated inputs) as shown in FIG. 6. These digital light waveforms are represented by the Sig 1 to Sig 6 tags.

Using the theory of Superposition, these six waveforms can combine (add) to form the resultant light waveform at the bottom of FIG. 6. Examination of this resultant form, especially the shaded sections, reveals that it represents a unique digital waveform with the two required characteristics; a frequency which is or can be equivalent to, or faster than, the original inputted waveform and an amplitude which is directly proportional (i.e. adjustable) to the number of superimposed waves used to form it.

Several points should be noted regarding this circuit which were alluded to previously prior to describing modifications needed to implement exemplary embodiments of the present invention. First, each optical switch (i.e. Mach-Zehnder) channel will yield some common maximum light pulse amplitude. Second, although the width of the light pulse may be indefinitely wide (i.e. gate left open), they do have a minimum pulse width which is related to the speed of the gate, the capacitive effects of the solid state device, and the actual electrical input pulse shape. Third, the amplitude of the resultant waveforms is directly related to an integer number (n) [multiplier] of Sig level waves and requires that the number of Sig waves be greater than n. That number (n) is not only directly related to the amplitude of the resultant but also to the frequency and width of pulse shapes within the Sig waveforms. Fourth, superposition allows increments of the positive pulse sections of the Sig waveforms to be added with other increments of other pulses to form the resultant section. A comparison of FIG. 3 to whole pulse addition of FIGS. 1 and 2 illustrates this concept. The time phase in this circuit, as with any circuit, is critical. As is apparent in the figure, the resultant wave is proportionately spaced and is consistent. In addition, it is predicated off the consistent phasing of the Sig waveforms. An examination of FIG. 6 reveals that the "Time Slot Increments" (TSIs) are key to phasing of all of the pulses and guard-bands. The width and spaces of the Sig pulses are made up of varying multipliers of the TSIs while the resultant pulses are consistently set at two TSIs and the guard-band spaces are one TSI, on a repetitive pattern in this example. The TSIs are the minimal increment for this circuit and should cross correlate to both electrical and optical signals. The way we accomplish that end is to set the threshold rise/fall time of the electrical pulse discussed previously to be the minimum TSI. The TSI is in reality a measure, or parameter, of the system clock signal and will, in practicality, be incremented slightly wider than the rise time. It should also be noted that resultant waveform need not follow the two to one TSI patterning of FIG. 6, but may be comprised of an integer number of TSIs so as to minimize the number of Sig waveforms needed and accommodate system phase considerations of the resultant.

To retain the phase consistency noted above, any shifts of any Sig waveforms to generate a different resultant pattern, must be performed by one or some integer number of TSIs at a time. Secondly, the resultant pulse pattern generated by a Sig waveform shift must result in and maintain the phase pattern previously established for that specific circuit (in the case of FIG. 6, a two to one, or three TSI repeating pattern in the resultant waveform). Different circuits need not have the same resultant TSI waveform pattern. The rationale/ necessity for establishing these rules will become apparent later.

To change the state of the media domain, it is necessary to provide a light pulse which exceeds the threshold value (amplitude) of the media. In FIG. 6, an arbitrary LV (Lumen Value) threshold line is shown, which requires at least a superimposed resultant level (or integer multiplier of) three Sig amplitudes to surpass it. It is apparent that this superposition technique can yield a higher or lower value by either increasing or decreasing the number of Sig circuits. Alternatively, it can likewise be increased or decreased by shifting or increasing/decreasing the pulse amplitude levels of the individual Sig circuits (a more efficient technique of the two choices).

An aspect of this embodiment is also illustrated in FIG. 6. As cited previously, superposition is utilized throughout electronics. Within that mode however, the resultant signal is formulated such that the objective waveform (i. e. digital waveform) is generated precisely with minimal to no extraneous form/shape. If the waveform cannot be generated directly in an "ideal" shape, subsequent waveforming techniques are used to bring it to this ideal condition. The rationale for this need for perfection is that the extraneous forms would be considered "noise" which is anathema to the electronics world. Noise or spurious signals can cause false signaling within a circuit or alternatively mask an output among a myriad of other unacceptable consequences. Within this specific embodiment, utilizing phase change media with its threshold requirement, extraneous wave shapes do not impact the media's change of state. As described previously, a defined minimum energy level must be applied to the media to flip (i.e., shift or change) it from one state to the other (i.e. much like a hysteresis loop for magnetic material). Examples of extraneous wave shapes are illustrated in the FIG. 6 resultant wave and are those shapes which are outlined but not shaded. Although these extraneous shapes do affect the environment of the media, they will not trigger the crystal to amorphous change of and by themselves.

Figure 7A:
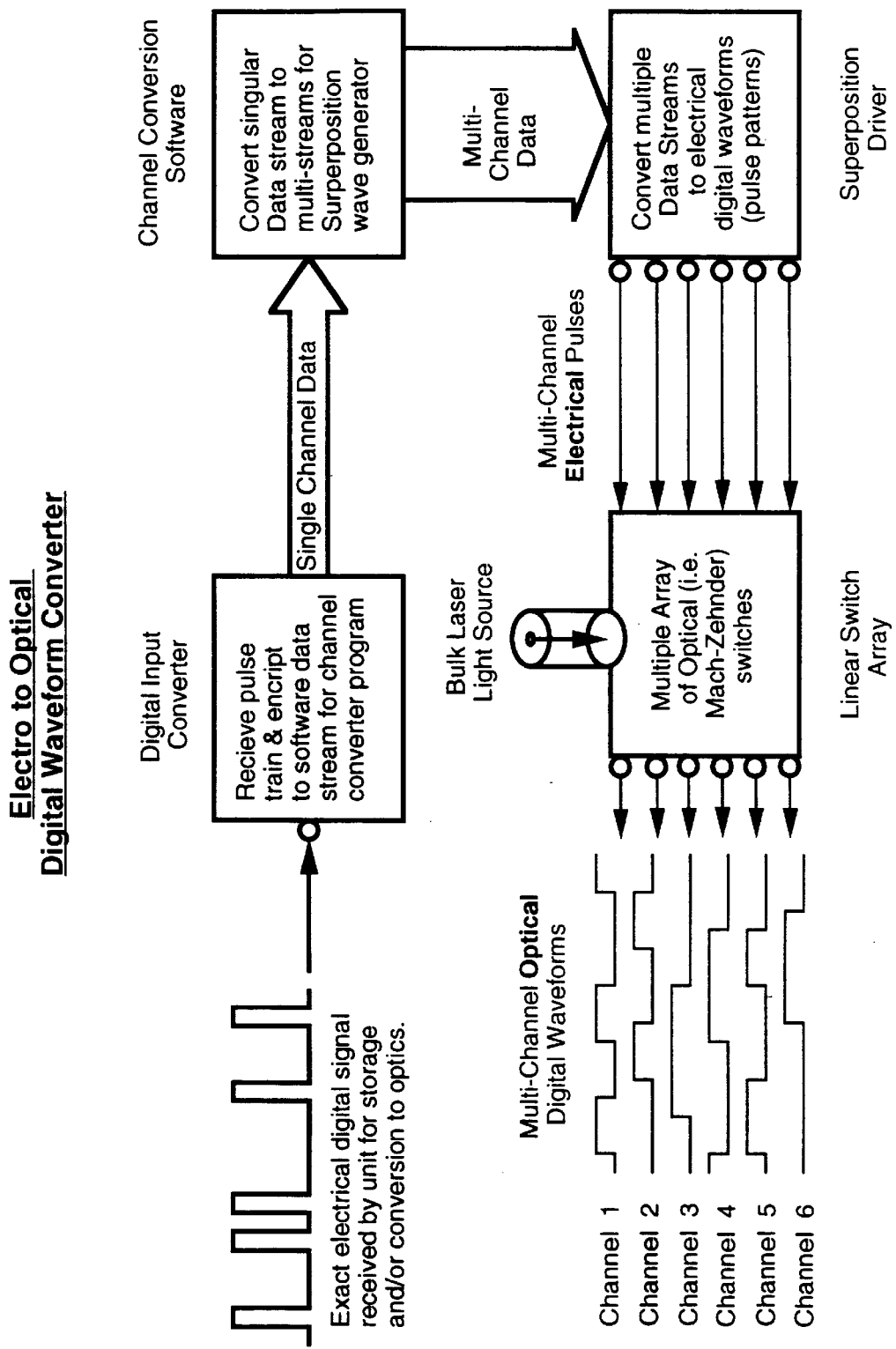
FIGS. 7A–7C illustrate a system, method and results for disassembling an electrical digital waveform into a series of optical waveforms at extended wavelengths using an optical switch according to exemplary embodiments of the present invention.

The methodology for generating the optical switch's multiple channel optical waveforms, which would eventually generate the resultant wave, is depicted in the block diagram of FIG. 7A. The input to the system is represented by the electrical digital waveform shown in the upper left-hand corner of FIG. 7A.

It iss recognized that electrical data may be received in a myriad of alternative pulse code formats, conforming to a variety of different industry standards. For simplicity we shall assume that this data stream is either raw uncoded data or decoded data that may be stored for later processing or is capable of being used immediately by a CPU. It should be recognized however that the format of the received data is not a restriction of this invention, as the converter is able to recast any electrical pulse pattern to an optical digital waveform series.

The first operation in the sequence is encrypting the electrical pulse stream to software data via the Digital Input Converter. Unlike normal I/O devices, the received electrical pulse stream is not reformatted, converted, encoded, or simlarly manipulated to an alternative electrical pulse stream form. After software encryption, the electrical waveform may alternatively be discarded. In the preferred embodiment, however, it will have a subsequent use and will be passed through to another check type circuit.

The Digital Input Converter may consist of a electronic sampling circuit, which feeds its results into a pass through FIFO (First In First Out) register/database. In the simplest form, as read by the sampling circuit, the inputted electrical pulse waveform would generate a binary value to the register so that each sampling pulse would yield either a "1" or "0" in a continuous stream (see FIG. 7B). Note that the sampling rate (number of sampling pulses per inputted pulse period) is much greater than that pulse period and graphically approaches the TSIs mentioned previously. Electrical theory requires that the sampling rate minimally be twice the highest (i. e. cutoff) frequency in the pulse pattern period for eventual reproduction of the sampled pulse pattern. The rate, however may be adjusted somewhat to suite the specific types of waveforms submitted to the circuit.

The output of the Digital Input Converter which can be delivered in the possible form of a register or a database, is fed to the "Channel Conversion Software" (FIG. 7A). The purpose of this stage is to code the single stream of data into multiple discrete data patterns suitable for eventually driving the superposition switches.

Figures 7B, 7C:
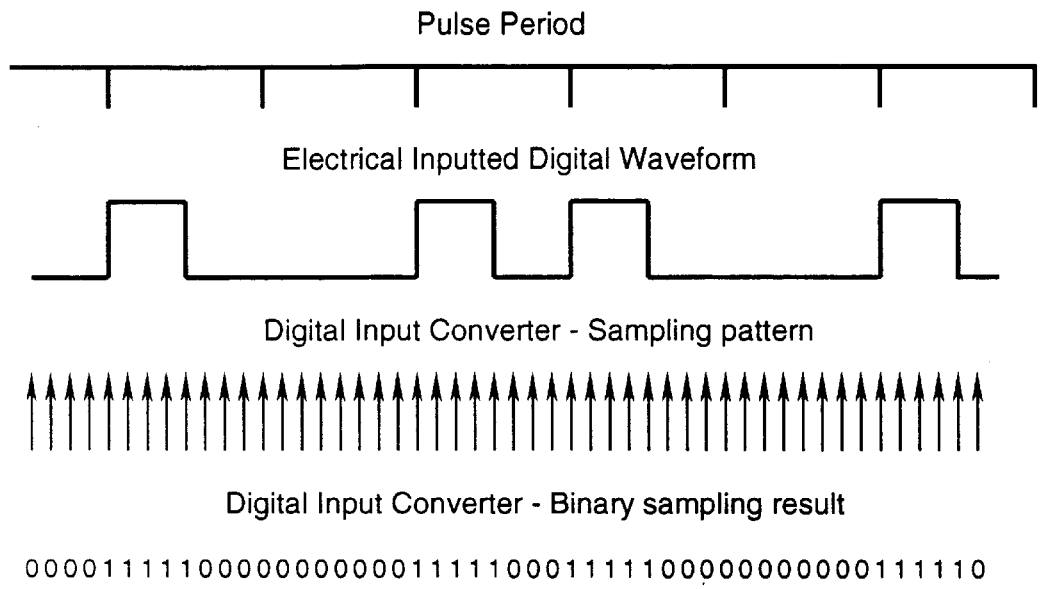

An example of how the data is disassembled is illustrated in FIG. 7C. The "SChan In" (horizontal row) represents the single channel data being fed into the "Channel Conversion Software" from the "Digital Input Converter". The "MChan" data sequences (six horizontal rows) represent the discrete multiple channel data which was dis-assembled from the SChan data. Of these six channels, an arbitrary number of pulse magnitudes (in this example, four the presence of which is marked by an "X") must be present in a specific vertical column within any of the MChan rows in order to represent a SChan "1" or positive sample pulse. That correlation can be validated by comparing the Total "X" s row with the SChan row within FIG. 7C. It should be reiterated that the number of magnitudes within the invention is arbitrary and is dependant only upon the maximum pulse amplitude (i. e. the magnitude) and how many of those magnitudes are minimally required in total (summation) to break through the threshold value (i.e. of the Phase Change material). Secondly, the number of MChan rows (i.e. data streams) are likewise arbitrary although they should be minimized. Their quantity is of course contingent on the number of aforementioned magnitudes but also on the time slot spacing constraints established by the input pulse stream period, the sampling frequency, and the eventual targeted output waveform shape (i. e. optical pulse width, guardband, and frequency).

The dis-assembly of the SChan data stream may be accomplished physically by two methods: hard circuit logic gates or microcode. Neither method will be shown herein as they should be apparent to those skilled-in-the-art.

The final stages of the "Digital Waveform Converter" (FIG. 7A) involves converting the MChan data streams into optical waveforms. The discrete MChan rows or data streams are passed first to the "Superposition Driver" which converts (i.e. transduces) the data streams to an equivalent number of "Multi-Channel Electrical Pulses". This is commercially available technology and will not be discussed herein.

These pulses are fed into a "Linear Switch Array". The array consists of an equivalent number of optical switches (such as the Mach-Zehnder) where one switch accepts one incoming channel's pulse stream. The light input into this switch array is a singular common laser source as shown in FIG. 7A. Note again that the optical switches are semi-conductor devices and as such, can be grouped into a single silicon device. As described previously, the switches open or close a light channel in response to the "Multi-Channel Electrical Pulses" and thereby emit the six exampled "Multi-Channel Optical Digital Waveforms" illustrated of FIG. 7A. Although not illustrated, it is these optical digital waveforms (i.e. the equivalents of the Sig 1 to 6 waveforms of FIG. 6) which will be superpositioned together to form one optical digital waveform which will be directed to write the encoded information on the media in an exemplary embodiment of the present invention.

From examination of FIGS. 7B and 7C, it could be deduced that the example illustrates a one to one wavelength/period correlation between the electrical input pulse waveform and the optical output pulse waveform. The switching output pulse, however, is four magnitudes in amplitude as previously discussed. The electrical inputted waveform period is eight sampling pulses wide, composed of five being the pulse itself and three the guard-band. This composition is translated through the matrix of FIG. 7C via the SChan, MChans, and total Xs.

In the previous discussion on TSIs (FIG. 6), it was suggested that the period of the optical output waveform can be modified by shifting/extending/contracting the Sig waveforms in integer increments of TSIs. The Sig waveforms may be equivalents of the MChans and the TSIs may be considered comparable to the time period of the sampling pulse pattern. In FIG. 7B, however, each sample pulse is provided with a value of either "1" or "0" in order to construct the MChan waveforms which eventually superimpose (add) to generate the optical output waveform.

Figure 8A:
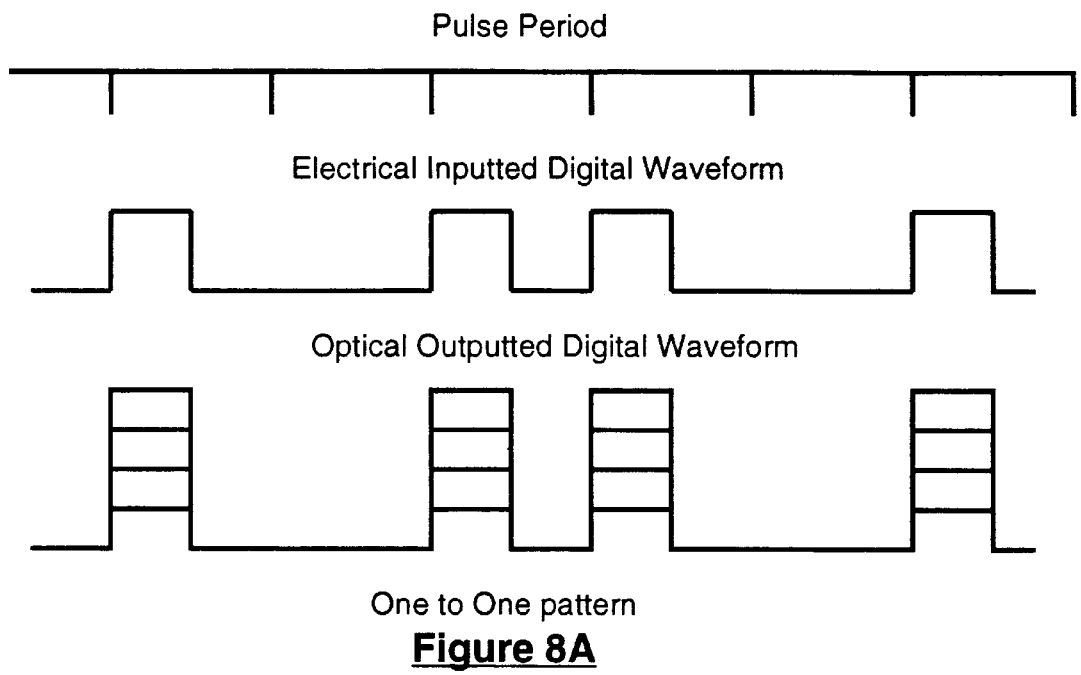
FIGS. 8A–8C illustrate optical waveforms having variable periods with respect to the corresponding input electrical digital waveform.
Figure 8B:
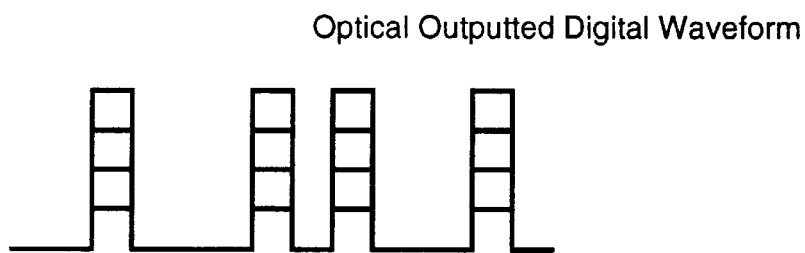
Figure 8C:
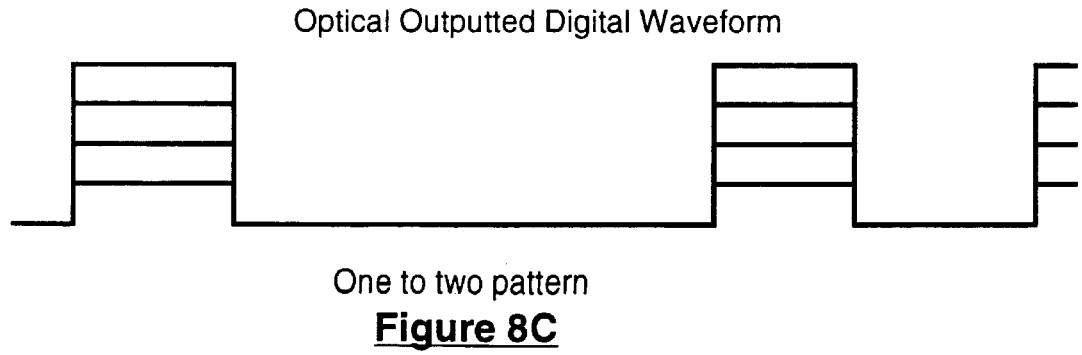

With reference to either SChan or Total X row of FIG. 7C, it is apparent where both the input and output positive signal pulse patterns lie (all 1's in SChan and all 4's in Total X). As stated before, the sequence is a one to one pattern (FIG. 8A). If the digital input disassembly is reduced by half (i.e. change the 5/3 pattern to 2/2 by eliminating MChan columns), the period of the output would be cut in half as illustrated in FIG. 8B. Likewise, the period may be doubled by artificially inserting columns (i. e. change the 5/3 pattern to 10/6) as illustrated in FIG. 8C.

Although the disassembly of the input waveform is theoretically feasible with software translations, just the comment of adding or subtracting MChan columns, does not address the switching speed capability of an optical switch. These switches which pass light through an electrically controlled gate have an operational time constant which is longer than the switching characteristic of a standard electronic gate. Refer to the minimum field pulse width requirement of FIG. 6.

Figure 9:
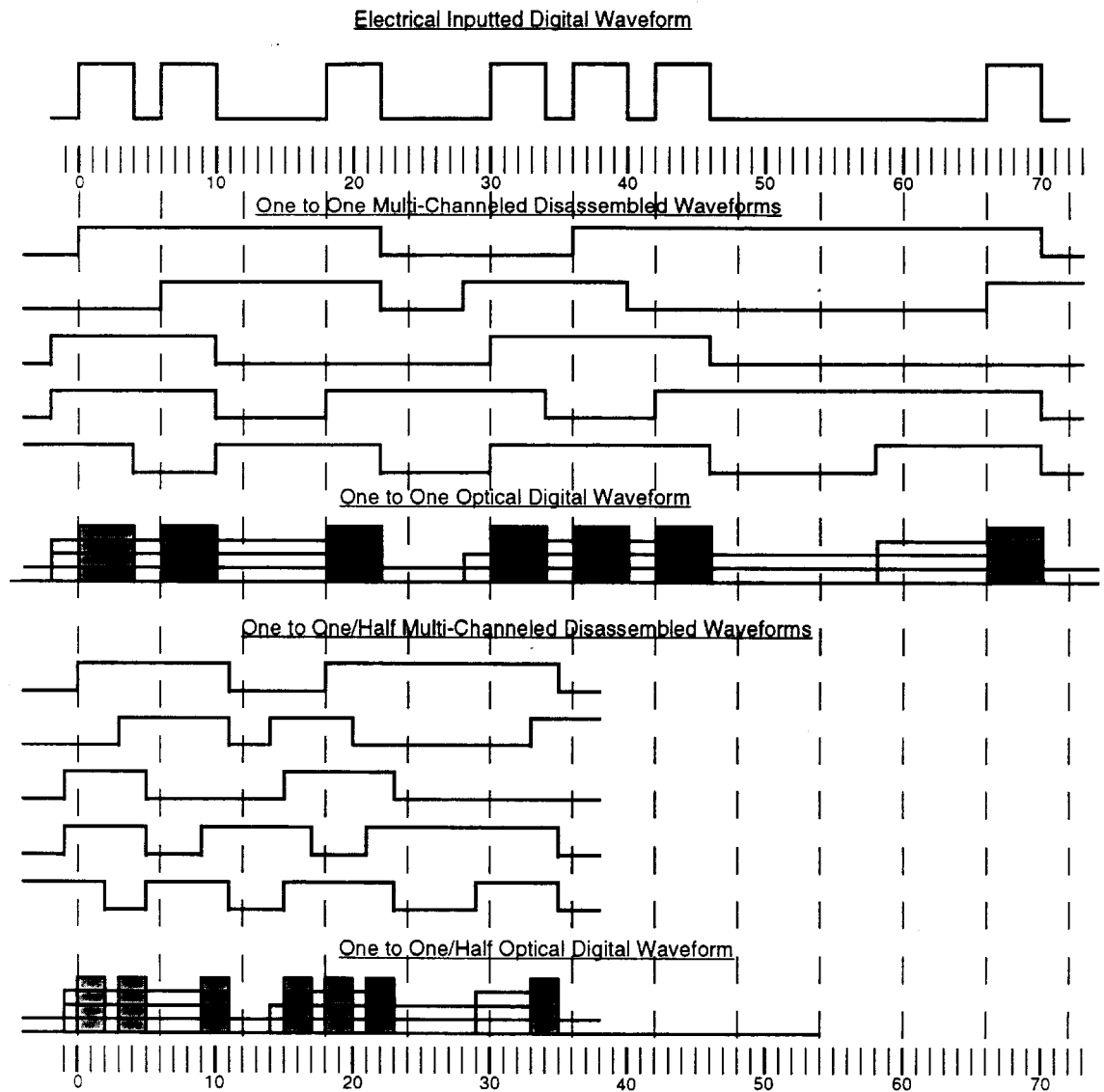
FIG. 9 illustrates the disassembly of an inputted waveform to a pattern which superpositions to a waveform at twice the frequency of the input.

The disassembly of the input may be programmed to affect the period of the output. Referring to FIG. 9, a waveform representing an electrically inputted waveform is depicted with a period of six (sample slots or TSIs), two of which are guardband and four of which are actual pulse width.

For illustrative and exemplary purposes, if a reduction of the optical waveform output period by half is desired (i.e. double the frequency between the input and the output) and we assume that the optical switch has an operational time constant (i.e. pulse width) of six slots to switch from zero to amplitude back to zero and a guardband of three slots. To achieve doubling of the frequency, the initial disassembly of the input pulse must be halved and the minimum pulse width and guardband of disassembled waveforms must be doubled or set at 12 and 6 respectively. With reference to FIG. 9, in the waveform grouping titled "one to one Multi-channeled Disassembled Waveforms", a five form wave pattern which reflects that requirement is illustrated.

Another requirement, that four magnitudes be placed on the optical output waveform, has been imposed and consequently five disassembled waveforms are required for the super-positioning. It should be pointed out that although amplitude requirements do not directly affect the waveform period changes, they do indirectly, as a greater pulse width minimum of the optical switch time constant physically forces more disassembly channels to be added just to accommodate the number of wider pulse widths needed to superimpose the eventual output signal. Although the technique to derive the ideal number will not be discussed herein, linear programming software would be required to accommodate all of the variables and yield the best solution parameters.

Referring back to FIG. 9, it can be seen that addition (i.e. super-position) of the five "one to one Multi-channeled Disassembled Waveforms" yields the "One to One Optical Digital Waveform" shown in the center of the figure, indicating that the dis-assembly pattern is correct in that regard. Since the target is a frequency doubled output, it is necessary to perform another operation on the five "one to one Multi-channeled Disassembled Waveforms" before they are added. That operation is reduces the waveform in half with respect to slot "0" (or alternatively removing zero columns in its MChan matrix, which is not illustrated). The results of this reduction is illustrated in FIG. 9 as the five "one to one/Half Multi-channeled Disassembled Waveforms". Adding (super-positioning) these five waveforms yields the result shown as "one to one/Half Optical Digital Waveform". Checking the period of this form does reveal a frequency doubled output.

Figure 10:
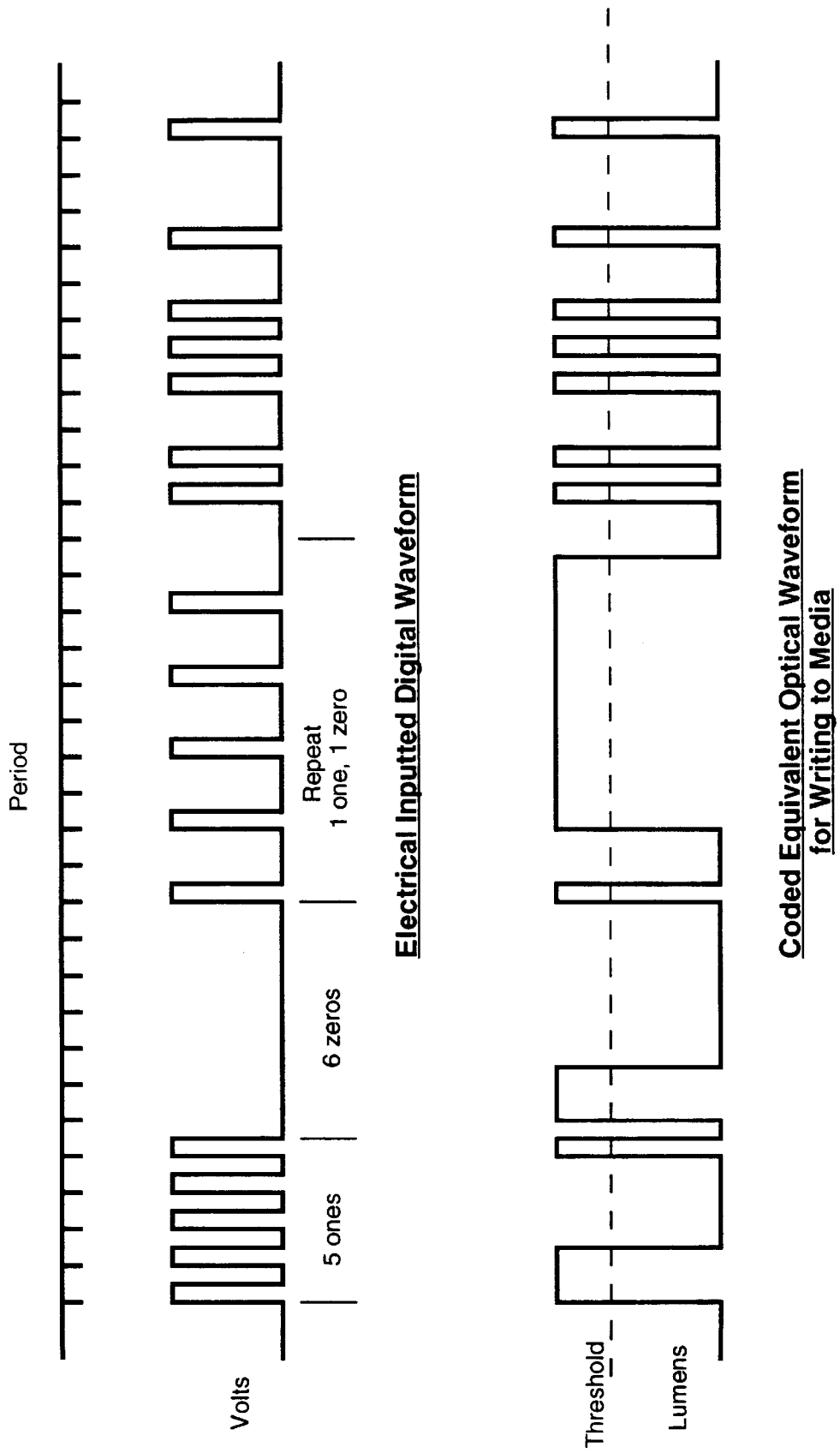
FIG. 10 illustrates a variation of a re-coded format of a waveform.
Figure 11:
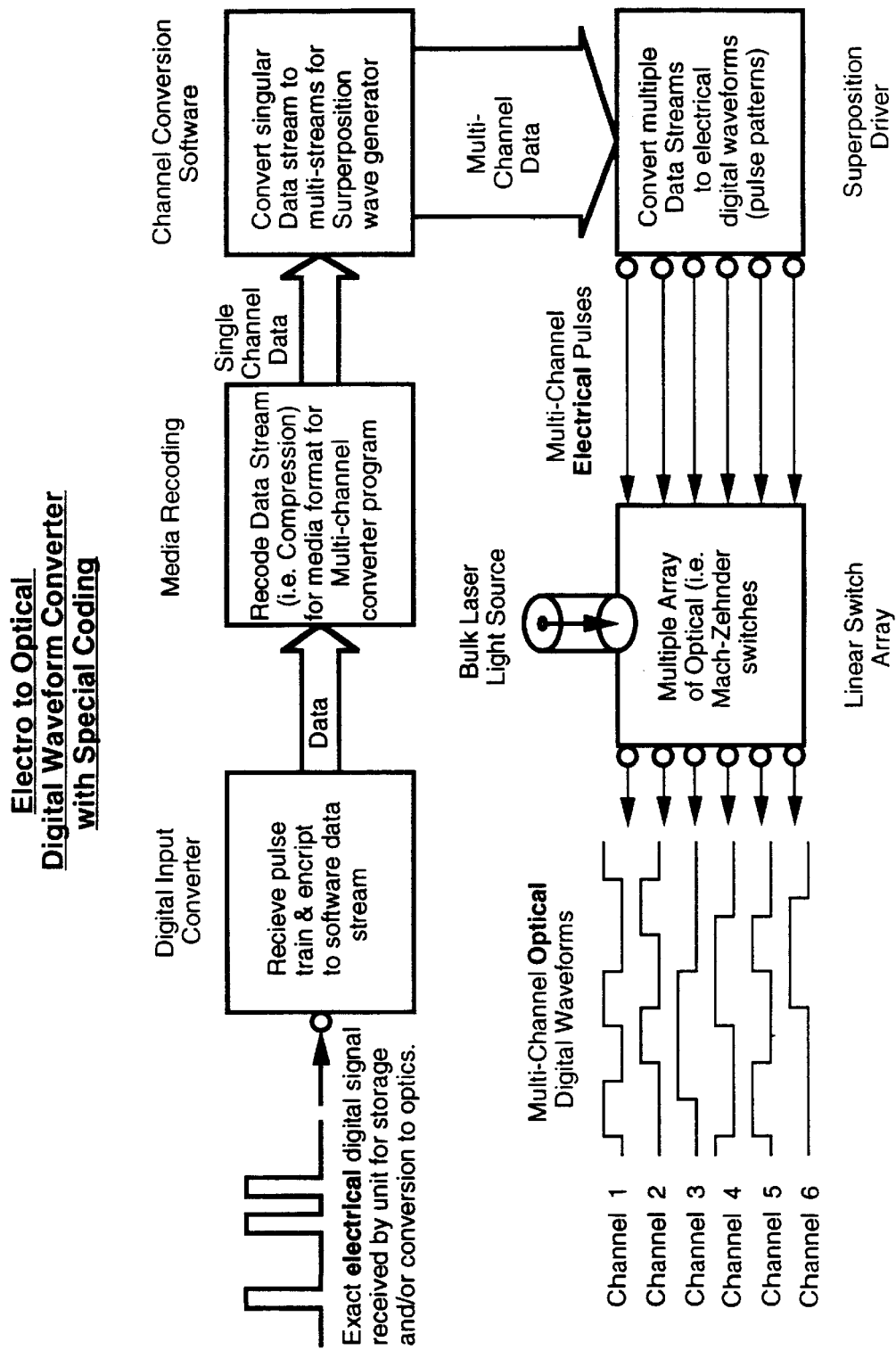
FIG. 11 illustrates a method for disassembling an electrical digital waveform after recoding into a series of optical waveforms at extended wavelengths using an optical switch.

As desribed in the previously cited patent documents (i.e., U.S. Pat. No. 5,815,482 and application Ser. No. 08/816, 688), multiple (parallel) optical digital writing pulses are directed toward a target. These parallel beams have a requirement that they arrive simultaneously at the target, although their optical paths have different lengths. To accommodate this goal the skew of these beams, relative to each other must be adjusted. As may be seen, one technique for accomplishing this adjustment is the addition of one or multiple MChan "0" columns in front of the respective waveforms. Within the Electronics and/or Electra-Optics industry, it is common practice to encrypt or compress the raw basic data so as to reduce the number of level swings or transitions thereby reducing the possibility of errors, reduce the amount of storage space required, and/or reduce the transmission time of the data file. An example of such an encryption is shown in FIG. 10. Although an encrypted pulse can be easily transduced by embodiments of the present invention, a slight modification is required in the sequence desribed with reference to FIG. 7A. This modification is the insertion of a "Media Recoding" step as shown in FIG. 11.

Figure 12:
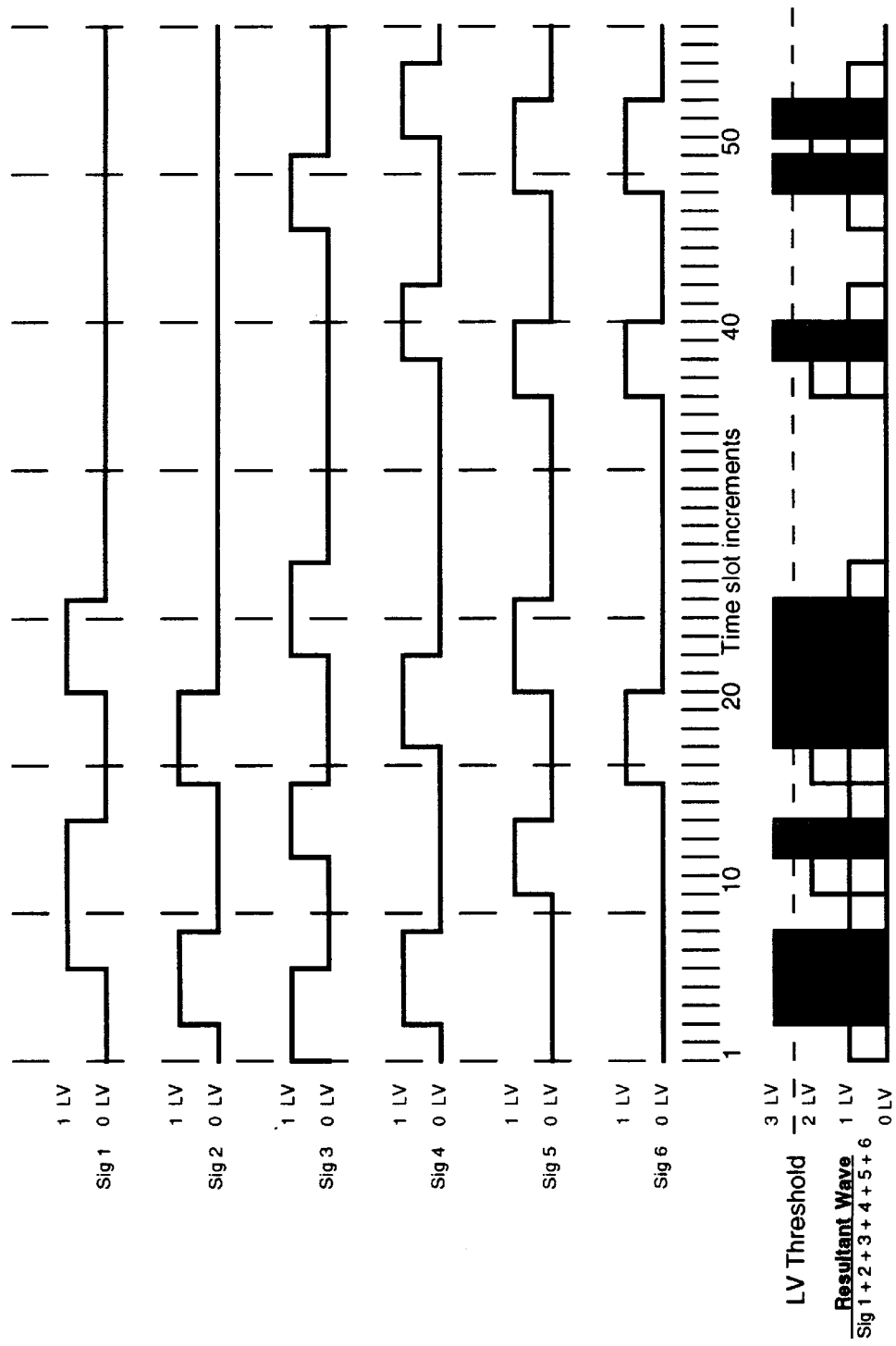
FIG. 12 illustrates the generation of a recoded digital optical waveform from multiple digital optical waveforms.

A series of waveforms illustrating that this technique can be utilized for encrypted waveforms is illustrated in FIG. 12. As described previously, the disassembly of the electrically inputted waveform could be accomplished by Standard logic gates or assembly level software and/or possibly a combination of both. The super-positioning of the MChans, however in the preferred embodiment are optical, and must be added in that mode.

Figure 13:
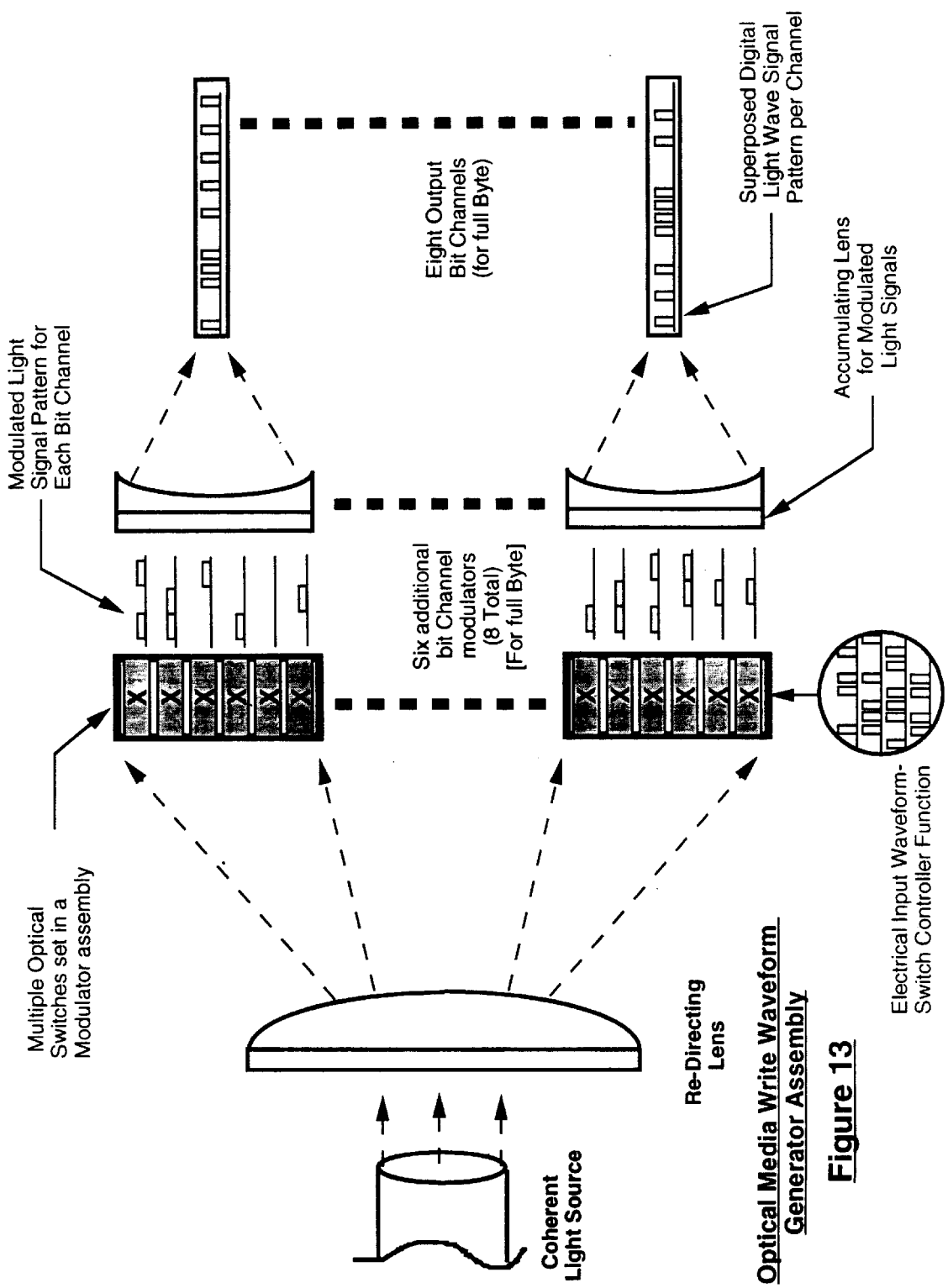
FIG. 13 illustrates an optical hardware configuration for generating multiple optical digital waveforms from multiple electrical waveforms.

FIG. 13 illustrates a series of eight optical switch assemblies, with the object of eventually generating a fall width byte (eight parallel bits) via eight output channels. The optical switch assemblies are each composed of multiple individual switches (six are illustrated). The two gates of each switch in the assembly are driven by an electrical waveform (i.e. the individual MChan waveforms as previously described for FIGS. 7A and 11). The light input channels of the eight assemblys are fed from a common light source beam and re-directing lens shown to the left in FIG. 13. FIGS. 7A and 11 refer to this source as the "Bulk Laser Light Source".

According to exemplary embodiments of the present invention, each Mach-Zehnder switch assembly (i.e. not the multiple ganged assemblies) be fed by a common source to assure their super-positioning (i.e. same frequency and in-phase addition). Certain applications may require that each of the output channels be composed of different frequencies in order to distinguish them in subsequent stages below this initial transmission/combination.

In the above-described patent documents, there is a requirement that all of the output channel waves impinging the target have the same frequency and be synchronized. Consequently, the source for all of the ganged assemblies must be synched and operate at one one frequency. The source may be composed of multiple lasers that are synchronized and operating at the same frequency.

Light is output from the switch assemblies based on the state of the electrical waveform feeding each switch, as illustrated by the optical waveforms to the right of the switches in FIG. 13. As illustrated therein, the six optical waveforms (i.e. the MChans) are fed into an accumulating lens which adds (i.e. super-positions) the waveforms into a light wave channel (i.e. a transmission medium) for delivery to the eventual target.

As previously described herein, the present invention provides a method and system for transducing an electrical digital waveform (or multiple synchronized electrical parallel digital waveforms) into an optical digital waveform (or multiple synchronized optical parallel digital waveforms), wherein the optical output is scalable in both amplitude and period versus the input. A multiple parallel wave output is synchronized between the output waveforms and time locked to the inputs. In addition, the invention provides the ability to artificially delay the outputted waveform by a pre-determined time delay.

Figure 14:
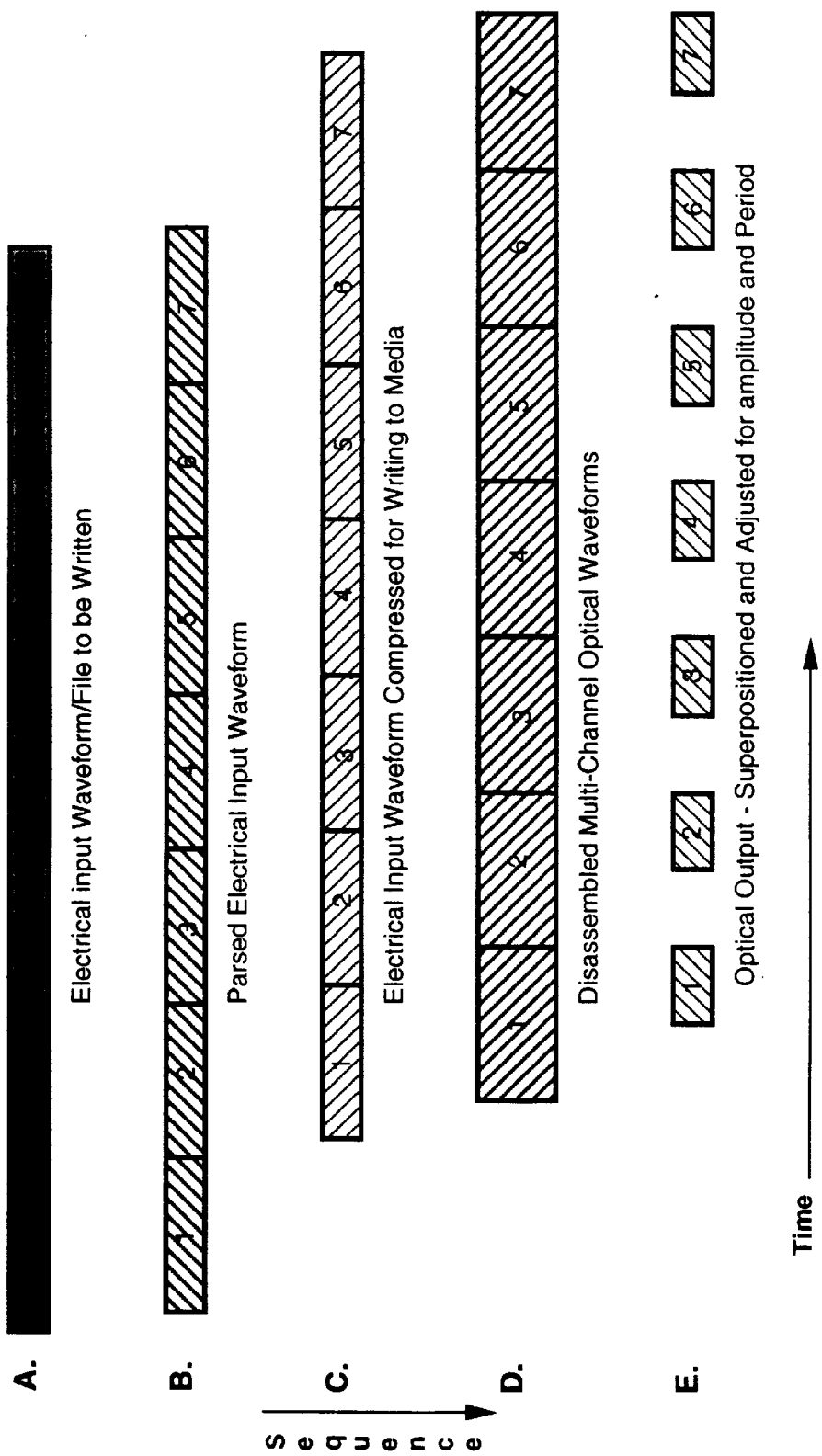
FIG. 14 illustrates the relative sequence of operations and the timing delay impact according to exemplary embodiments of the present invention.

The invention is designed to operate in real time. According to exemplary embodiments, the electrical input waveform will be immediately received, and continuously read, into the system. As this input waveform is progressively read and operated upon, as described previously, there will be a delay introduced between that input reception and the output waveform due to the processing (i.e. parsing, compression, dis-assembly, and superposition). FIG. 14 illustrates these processing stages and the relative timing impacts. As seen, the principal delay is directly dependant upon size of the segment or parsing of the original waveform. It is common practice in the data storage industry to interleave data sectors. Currently, data sectors in this industry are commonly segmented into 512 bytes. This size, however, is not a necessary requirement of either this invention or the above-referenced patent documents. Regardless of the size, the first segment of the input waveform must be fully read by the invention before processing can begin, which is the primary cause of delay.

It should also be be noted that the optical output is depicted in FIG. 14 as individual blocks, each related back to the input segments, but at a reduced size. The cause of this being, the reduced period (frequency increase) of the optical output compared to the input. In the preferred embodiment this allows an amount of time for the segments to be processed for each output block. Two points should be emphasized regarding the separate block timing. First, the data will be written in a continuous fashion to the media in the preferred embodiment despite the block timing separation. Secondly, as the preferred embodiment has multiple Read/Write channels which can operate simultaneously, The time periods between output segments of one file can be multiplexed with a second independent file, to allow maximum utilization of the channels.

While the invention herein disclosed has been described by means of specific embodiments and applications thereof, numerous applications and variations could be made thereto by those skilled in the art without departing from the spirit and scope of the present invention.

Figure 15:
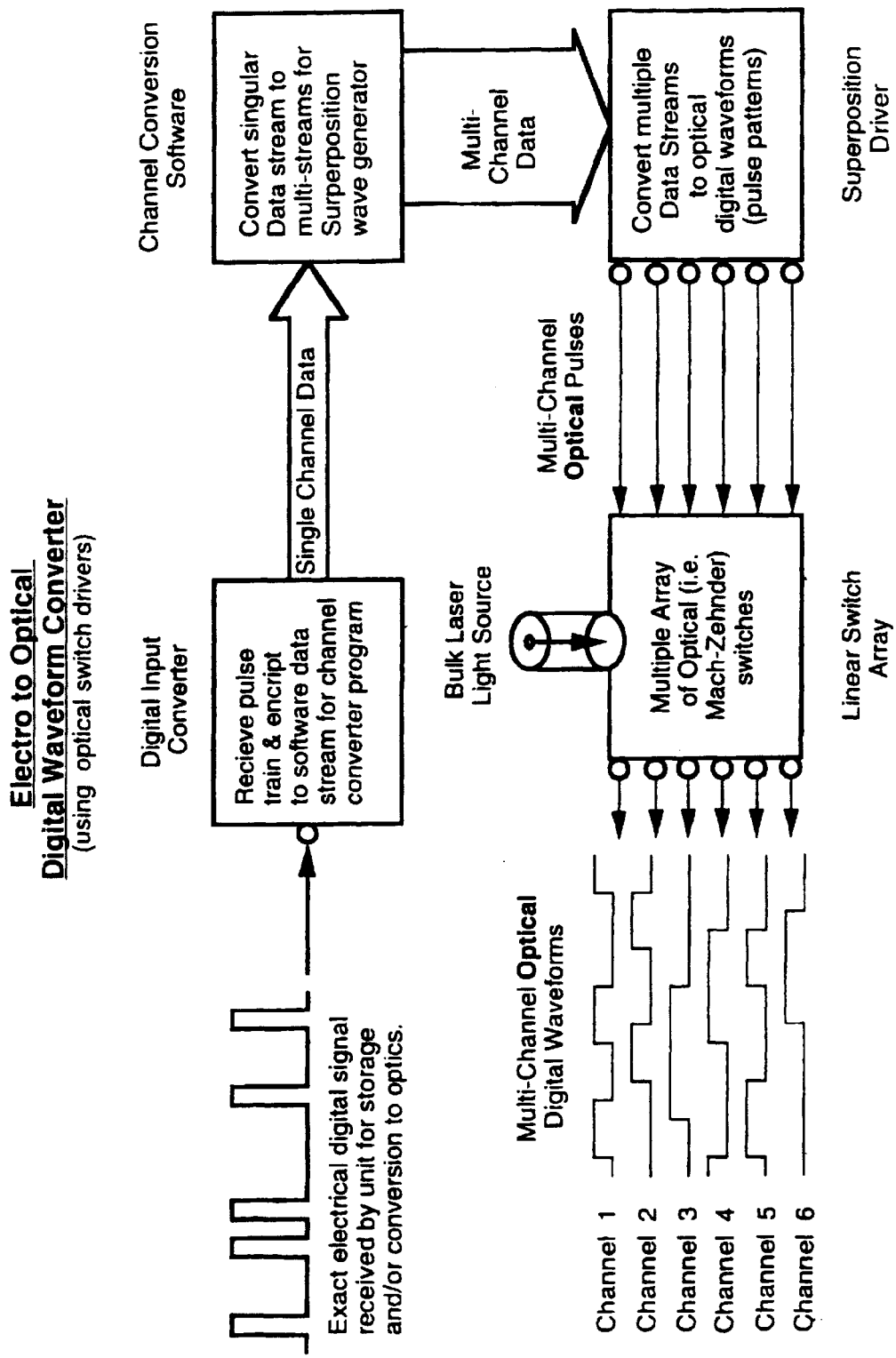
FIG. 15 illustrates another embodiment of the present invention for disassembling an electrical digital waveform into a series of optical waveforms at extended wavelengths using an optical switch.

For example, FIG. 7A illustrates the input of multi-channel electrical pulses to the linear switch array. The Mach-Zehnder switch is turned on or off by electrical signals in this embodiment. However, this switch may also be operated (i.e., turned on or off) by optical signals. A variant of an exemplary embodiment of the present invention may also operate with optical signals triggering the switch array. With reference to FIG. 15 which is a variation of FIG. 7, the multi-channel data is converted to optical pulses in the superposition driver (as opposed to multi-channel electrical pulses) which may be used as input to the switch array to trigger the optical switches in the array and produce a multi-channel optical digital wave form which may be superpositioned to obtain a pulse stack for writing data to storage media.

It is, therefore, to be understood that within the scope of the appended claims, the present invention may be practiced other than as specifically described herein.

What is claimed is:

1. A method for converting an electrical signal to an optical pulse, said method comprising the steps of:
   receiving said electrical signal;
   sampling said received signal to obtain a single channel data;
   converting said single channel data to multi-channel data;
   converting said multi-channel data to a plurality of electrical pulses;
   inputting said plurality of electrical pulses and a light source output into a switch array comprising a plurality of optical switches, with each of said plurality of electrical pulses corresponding to at least one of the optical switches, to obtain a multi-channel optical waveform comprising a plurality of optical waveforms; and
   superpositioning each of the plurality of optical waveforms to generate a stacked optical pulse.

2. The method of claim 1 wherein the sampling of the received signal is performed at a predetermined rate.

3. The method of claim 1 wherein the sampling is performed at a rate that is at least two times a frequency of the received signal.

4. The method of claim 1 wherein the multi-channel data is converted to the electrical pulses by a linear program software.

5. The method of claim 1, wherein the light source is a laser.

6. The method of claim 1, wherein the single channel data is in a software data stream form.

7. The method of claim 1, wherein the single channel data is stored for latter conversion to multi-channel data.

8. The method of claim 1, wherein the multi-channel data comprises multiple discrete data patterns.

9. The method of claim 1, wherein the optical waveform operates at a same frequency as the electrical signal.

10. The method of claim 1, wherein a frequency corresponding to the optical waveform is a multiple of a frequency corresponding to the electrical signal.

11. The method of claim 1, wherein the optical waveform frequency is a fractional multiple of the electrical signal.

12. A system for converting an electrical signal to an optical waveform, said system comprising:

a digital converter means for receiving and sampling said electrical signal to obtain a single channel binary data;

a channel conversion means for converting said single channel data to multi-channel data;

a digital pulse generation means for converting said multi-channel data to a first plurality of electrical pulses;

a switch means, comprising a second plurality of optical switches, for receiving said first plurality of electrical pulses and a light source output wherein each of said electrical pulses corresponds to at least one of the optical switches, and for outputting a multi-channel optical waveform comprising a plurality of optical waveforms; and a stacking means for superpositioning the plurality of optical waveforms.

13. The system of claim 12, wherein the switch means is a linear switch array.

14. The system of claim 13, wherein the switch array is a plurality of optical switches.

15. The system of claim 14, wherein at least one of the optical switches is a Mach-Zehnder switch.

16. A method of using optical pulses to write data generated from an electrical signal, said method comprising the steps of:

receiving an electrical signal;

sampling said received signal to obtain a single channel binary data;

converting said single channel data to multi-channel binary data;

converting said multi-channel data to a plurality of electrical pulses;

inputting said plurality of electrical pulses and a light source output into a switch array comprising a plurality of optical switches, with each of said electrical pulses corresponding to at least one of the plurality of optical switches, to obtain a multi-channel optical pulse waveform comprising a plurality of optical waveforms;

stacking the optical waveform by superpositioning an amplitude of each of the plurality of optical waveforms to form a stacked optical pulse;

deriving data from said stacked optical waveform; and writing said derived data onto a storage medium on a non real-time basis.

17. The method of claim 16 wherein the multi-channel data is converted to the electrical pulses by a linear program software.

18. The method of claim 16 wherein said derivation is based on comparing an amplitude of said waveform with a power threshold value during a predetermined time period.

19. The method of claim 18, wherein said threshold value represents a power level needed to write data onto the storage medium.

20. The method of claim 18, wherein said derivation is further based on comparing a duration of a pulse of the optical pulse waveform with a pulse duration threshold value.

21. The method of claim 19, wherein said pulse duration threshold value represents a pulse duration needed to write data onto the storage medium.

22. A method for converting an electrical signal to an optical pulse, said method comprising the steps of:

receiving said electrical signal;

sampling said received signal to obtain a single channel data;

converting said single channel data to multi-channel data;

converting said multi-channel data to a plurality of optical pulses;

inputting said plurality of optical pulses and a light source output into a switch array comprising a plurality of optical switches, with each of said plurality of optical pulses corresponding to at least one of the optical switches, to obtain a multi-channel optical waveform comprising a plurality of optical waveforms; and superpositioning each of the plurality of optical waveforms to generate a stacked optical pulse.

* * * * *